(12) United States Patent
Newton

(10) Patent No.: US 7,683,271 B2
(45) Date of Patent: Mar. 23, 2010

(54) SYSTEM FOR ACCURATELY WEIGHING SOLIDS AND CONTROL MECHANISM FOR SAME

(75) Inventor: Christopher William Newton, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/911,145

(22) PCT Filed: Mar. 27, 2006

(86) PCT No.: PCT/US2006/011266

§ 371 (c)(1),
(2), (4) Date: Oct. 10, 2007

(87) PCT Pub. No.: WO2006/113065

PCT Pub. Date: Oct. 26, 2006

(65) Prior Publication Data

US 2008/0223626 A1   Sep. 18, 2008

Related U.S. Application Data

(60) Provisional application No. 60/670,525, filed on Apr. 12, 2005.

(51) Int. Cl.
*G01G 13/00*   (2006.01)
*G01G 21/30*   (2006.01)
*G05D 16/20*   (2006.01)

(52) U.S. Cl. ............................ 177/116; 222/77; 141/83; 406/14; 406/146

(58) Field of Classification Search ......... 177/116–122; 222/55, 56, 77; 141/83; 406/14, 31, 79, 406/146
See application file for complete search history.

(56) References Cited

U.S. PATENT DOCUMENTS

| | | | | |
|---|---|---|---|---|
| 4,391,993 A * | 7/1983 | Sayles | ............................ | 568/4 |
| 4,513,830 A * | 4/1985 | Persbeck et al. | ................ | 177/1 |
| 4,669,921 A * | 6/1987 | Flament et al. | ................ | 406/14 |
| 5,131,225 A * | 7/1992 | Roettger | ........................ | 60/785 |
| 5,609,481 A * | 3/1997 | Kobayashi | ..................... | 432/22 |
| 5,670,751 A * | 9/1997 | Hafner | ........................... | 177/1 |
| 5,753,868 A * | 5/1998 | Diem | ............................ | 177/70 |
| 5,964,085 A * | 10/1999 | Newby | .......................... | 60/781 |
| 6,123,765 A * | 9/2000 | Sinha et al. | .................... | 117/84 |
| 6,431,950 B1 * | 8/2002 | Mayes | ............................ | 451/5 |
| 6,997,013 B2 * | 2/2006 | Jones | ............................ | 62/655 |
| 7,013,905 B2 * | 3/2006 | Jones et al. | ..................... | 137/12 |
| 7,368,671 B2 * | 5/2008 | Volkmann | .................... | 177/116 |
| 2004/0124549 A1 * | 7/2004 | Curran | ...................... | 261/121.1 |
| 2004/0217994 A1 * | 11/2004 | Otis, Jr. | .......................... | 347/7 |
| 2007/0097186 A1 * | 5/2007 | Lewey et al. | ................... | 347/85 |
| 2008/0017248 A1 * | 1/2008 | Massey et al. | ................. | 137/14 |
| 2008/0185190 A1 * | 8/2008 | Newton | ........................ | 177/180 |
| 2008/0196764 A1 * | 8/2008 | Newton | ......................... | 137/14 |

* cited by examiner

*Primary Examiner*—Randy W Gibson
(74) *Attorney, Agent, or Firm*—Woodcock Washburn LLP

(57) ABSTRACT

A system for accurately weighing a mass of material, including a closed chamber (20) having a gas inlet (22) and a gas outlet (24). A scale (30) is disposed in the closed chamber (20). An inert gas supply, under positive pressure, is connected to the gas inlet (22) and a vacuum powered pressure regulator (100) is connected to the gas outlet (24) to maintain a predetermined pressure level within the closed chamber (20) and to substantially inhibit pressure fluctuations within the chamber (20) that may affect accuracy of the scale (30).

16 Claims, 5 Drawing Sheets

SYSTEM FOR ACCURATELY WEIGHING SOLIDS AND CONTROL MECHANISM FOR SAME

CROSS-REFERENCE TO RELATED APPLICATIONS

This application is the National Stage of International Application No. PCT/US2006/011266, filed Mar. 27, 2006, which claims the benefit of U.S. Provisional Application Nos. 60/670,525, filed Apr. 12, 2005, the disclosure of which is incorporated herein by reference in its entirety.

FIELD OF THE INVENTION

The present invention relates to apparatuses, systems and processes for weighing or otherwise evaluating a mass of material. Certain aspects of the invention may include accepting, weighing and dispensing batches of material. Certain other aspects of the invention may include pressure regulators for the apparatuses, systems and processes of the present invention.

BACKGROUND OF THE INVENTION

Methods of manufacturing goods from a variety of ingredients typically include a step of measuring the individual ingredients prior to combining them. Accuracy of the measurements can be extremely important in some applications, to the point where uncontrolled variation can affect the operability or desired properties of the final manufactured good.

One of the suitable uses for the present invention is weighing, and optionally dispensing, batches of monomer and additives that can be combined to form polymers from which fibers are ultimately made. For example, azole-forming monomers (or monomer complexes) and metal additives can be processed by the apparatuses and systems of the present invention. Monomer/additive powers are feed into the apparatuses, typically via a screw feeder, until a mass of material with a known weight is obtained. The mass of material is then reacted in a solution comprising polyphosphoric acid to form a polyareneazole polymer. The polymer is then extruded through a spinneret to form individual fibers. The fibers can be further processed into yarns, fabrics, and other articles. Accurately weighing the monomer and additives in this example is important for obtaining a fiber having a desired fiber strength, among other properties.

It should be noted that the present invention is not limited to the exemplary use identified above. The apparatuses and systems are suitable for a variety of solids handling applications, including, as further examples, baking ingredients, gun powder, and pharmaceutical formulation ingredients.

SUMMARY OF THE INVENTION

In accordance with one preferred embodiment of the present invention, there has now been provided a system for accurately weighing a mass of material, comprising a closed chamber including a chamber gas inlet and a gas outlet; an inert gas supply under positive pressure connected to the gas inlet; a scale disposed in the closed chamber; and a vacuum powered pressure regulator operatively connected to the gas outlet to maintain a predetermined pressure level within the closed chamber and to substantially inhibit pressure fluctuations within the closed chamber.

In accordance with another preferred embodiment of the present invention, there has now been provided a process for accurately weighing and dispensing a mass of material, comprising the steps of providing a closed chamber including a scale disposed therein and a receptacle operatively connected to the scale; adding a mass of material to the receptacle from a material supply line that is disposed above and physically unconnected from the receptacle; controlling pressure within the closed chamber through operation of a vacuum powered pressure regulator connected to the closed chamber; and dispensing the mass of material from the receptacle via a dispensing conduit disposed below and physically unconnected from the receptacle.

In accordance with yet another preferred embodiment of the present invention, there has now been provided a process for accurately weighing a mass of material, comprising the steps of providing a closed chamber including a scale disposed therein and a receptacle operatively connected to the scale; continuously sweeping the closed chamber by introducing an inert gas under positive pressure into the closed chamber through a gas inlet; continuously exhausting the inert gas from the closed chamber through a gas outlet; and controlling a pressure level within the close chamber when exhausting the inert gas, to within about 0.125 kPa.

These and various other features of novelty, and their respective advantages, are pointed out with particularity in the claims annexed hereto and forming a part hereof. However, for a better understanding of aspects of the invention, reference should be made to the drawings which form a further part hereof, and to the accompanying descriptive matter, in which there is illustrated preferred embodiments.

DETAILED DESCRIPTION OF ILLUSTRATIVE EMBODIMENTS

The present invention may be understood more readily by reference to the following detailed description of illustrative and preferred embodiments taken in connection with the accompanying figures that form a part of this disclosure. It is to be understood that the scope of the claims is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Figure 1:
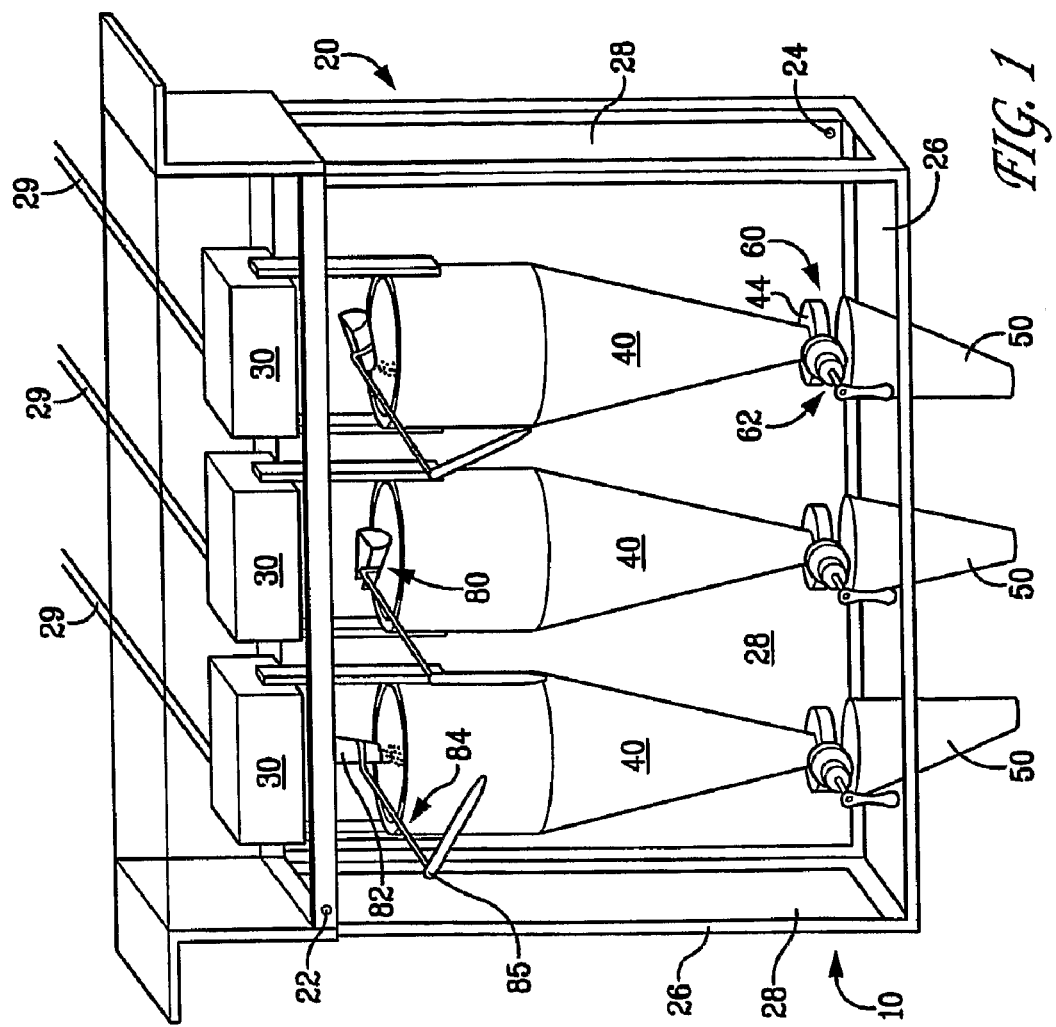
FIG. 1 is a perspective view of one preferred apparatus embodiment of the present invention that is useful for weighing and dispensing a mass of material.

Referring now to the figures, wherein like features are labeled with like reference characters, an exemplary apparatus 10 in accordance with the present invention is shown in FIG. 1, including a chamber 20, three individual scales 30, three receptacles 40 operatively connected to scales 30, and three dispensing conduits 50. Although FIG. 1 shows multiple scales, receptacles and dispensing conduits, alternate embodiments contain fewer and greater numbers of these components.

In one preferred embodiment, chamber 20 is an isolation chamber having environmental conditions that are different than those surrounding chamber 20. For example, the chamber can be discontinuously or continuously purged with an inert gas (e.g., nitrogen or argon), so as to render the chamber substantially moisture and/or oxygen free to help prevent material contamination. As shown, chamber 20 has a gas inlet 22 for introducing an inert gas and a gas outlet 24 for exhausting the inert gas. Chamber 20 may also have controlled pressure and/or temperature levels. Thus, components extending into chamber 20 preferably have sealed entry ways. Chamber 20 can be constructed from any number of materials, such as, for example, stainless steel, acrylic plastic, glass, polycarbonate, or a combination of different materials. As shown in FIG. 1, chamber 20 is constructed to include a frame 26 and a plurality of panels 28. By way of example, frame 26 may be made out of stainless steel and the panels 28 out of a transparent polymeric material, such as an acrylic. In a preferred embodiment, a chamber is isolated or closed if it has one or more methods of control of the atmospheric environment in the chamber such that the chamber is maintained in a state different than ambient conditions, such as, for example, under an inert gas or a pressure higher or lower than atmospheric pressure. A chamber can also be closed if it has one or more methods of control of a first atmospheric environment in the chamber in a state substantially different from that of a second environment in process equipment or piping in fluid or otherwise communication with that chamber.

Each of scales 30 is preferably a high precision scale capable of yielding, for example, a weight measurement accuracy to 0.1 grams for a 20 kilogram mass. One suitable scale is model number SG32001 available from Mettler Toledo corporation of Columbus, Ohio. It is noted that other scales can also be used in accordance with the present invention, and that the appended claims are not limited in scope to scales possessing a certain measurement precision unless the same is explicitly recited. "Scale," as that term is used herein, includes all devices compassed by a person and technical dictionaries, and further includes, but is not limited to, devices including a load cell.

Receptacles 40 are shown suspended from scales 30, but other connective and positional arrangements can equally be employed. Receptacles 40 can have various geometries, including the conical shape as shown in FIG. 1. Conical and other similar shapes help to ensure that all of the material accumulated for a given batch can be discharged from the receptacle. Each of receptacles 40 includes an inlet 42 and an outlet 44. The outlets 44 are covered by an exemplary valve 60, which is discussed in more detail below. In a preferred embodiment, inlet 42 is spaced apart from, or at least physically unconnected from, a material supply line 29, and outlet 44 is spaced apart from, or at least physically unconnected, from dispensing conduit 50. Connecting a component to receptacle 40, other than the scale, is believed to reduce weight measurement accuracy, and therefore connections are avoided in applications where accuracy is critical. This preferred configuration should not be interpreted as a disclaimer for understanding the breadth of the invention and claim construction purposes, as claims that do not specifically recite such a configuration are not so limited.

Along these same lines, an actuator 62 for operating valve 60 is preferably capable of being decoupled from valve 60 while weighing a batch of material. As shown in FIG. 1, actuator 62 preferably extends through and is held by one of chamber panels 28. For example, an actuator axis can pass through an o-ring lined aperture in the chamber panel.

Figure 2:
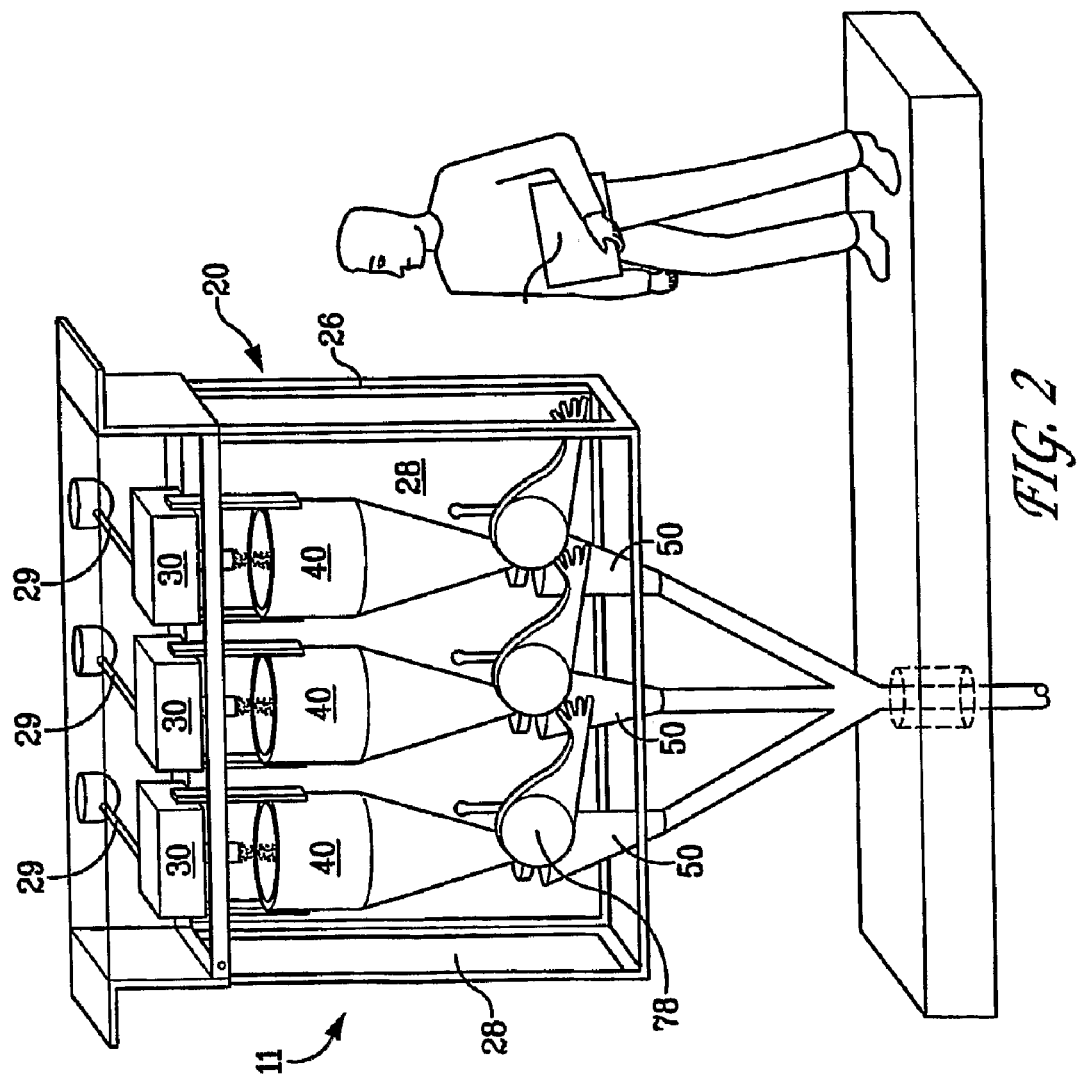
FIG. 2 is a perspective view of another preferred apparatus embodiment in accordance with the present invention, showing a portion for mixing up to three different raw materials after batches of the same have been measured.
Figure 3A:
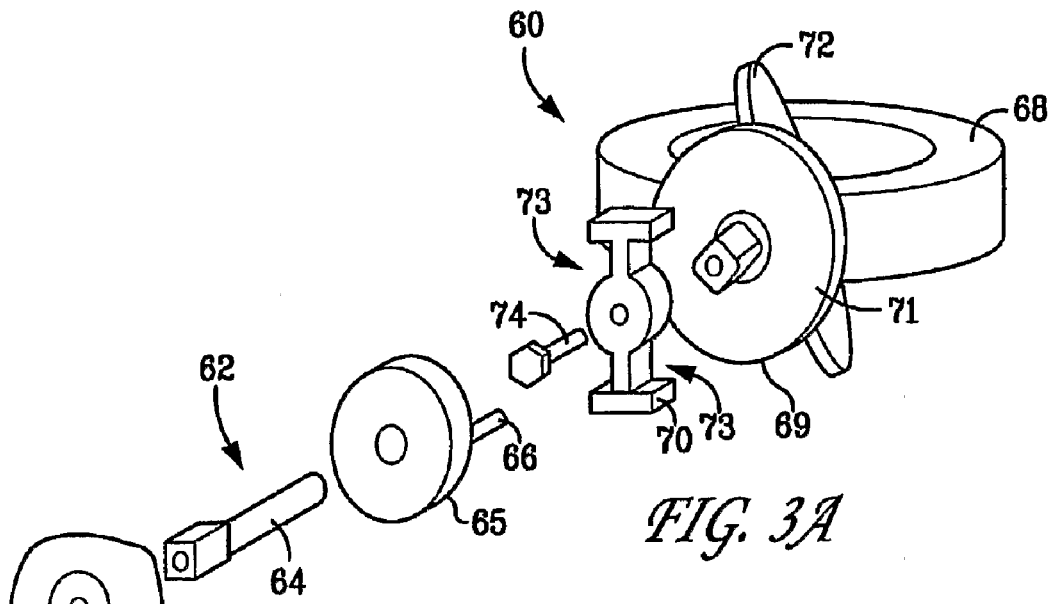
FIG. 3A is an exploded perspective view of one preferred valve and valve actuator provided by the present invention.
Figure 3B:
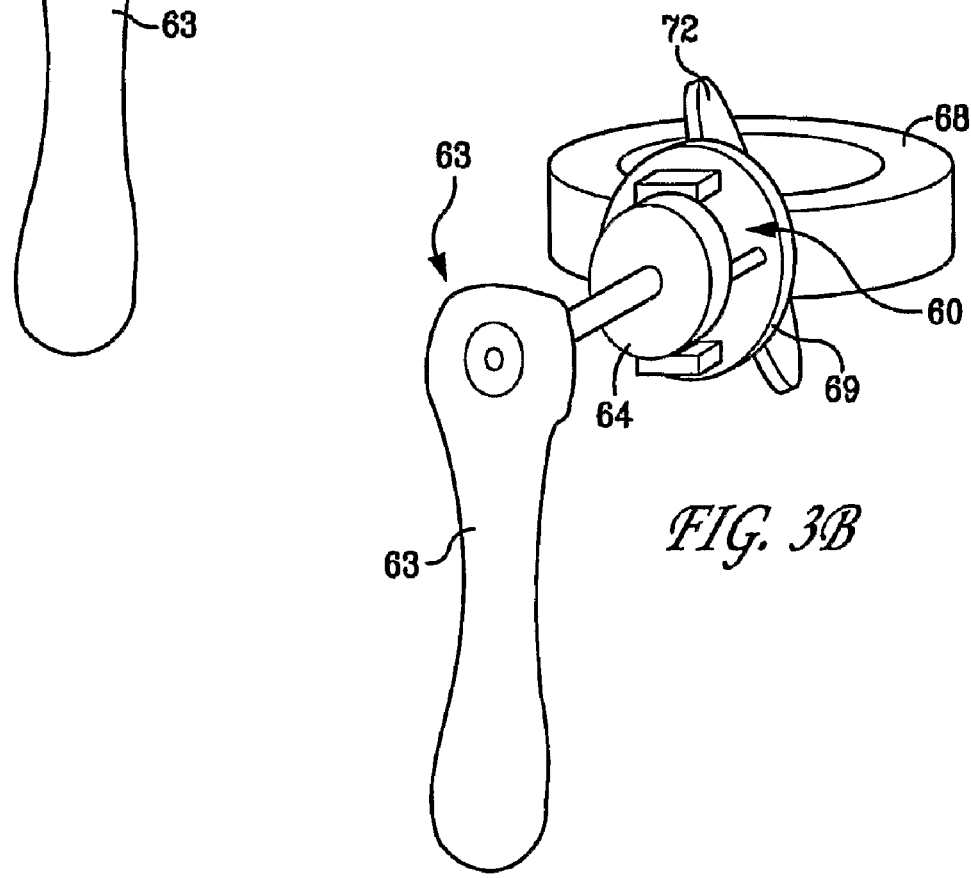
FIG. 3B is an assembled perspective view of the valve and valve actuator shown in FIG. 3A.

A more detailed view of exemplary valve 60, actuator 62, and related components is illustrated in FIGS. 3A and 3B. Actuator 62 includes a handle 63, an axis 64, and a male coupling 65 having opposing projections 66. Valve 60 includes a valve body 68, a connection member 69, and a female coupling 70. Female coupling 70 is attached to a shaft 71, via hardware 74, which is attached to a disk-shaped member 72 rotatably disposed within valve body 68. Disk-shaped member 72 is shown in a partially open position for illustration purposes only (obviously, handle 63, male coupling 65 and female coupling 70 would be rotated to a second position that is not shown to cause the rotation of the disk-shaped member 72). When material is being fed into receptacles 40, or when a weight measurement is being taken, projections 66 do not contact female coupling 70; that is, actuator 62 is decoupled from valve 60. To discharge a batch of material, handle 63 is rotated, causing projections 66 to rotate and engage channels 73 defined on female coupling 70. Additional handle rotation will cause the disk-shaped member 72 to rotate sufficiently to allow the batch of material accumulated in receptacles 40 to be discharged. One suitable valve is a butterfly valve offered by Asahi. Other valve and actuator designs can equally be used in accordance with the present invention. Furthermore, in alternate embodiments, the valve actuator is completely disposed within the chamber rather than extending through a panel of the chamber. With this arrangement and with reference to FIG. 2 showing another exemplary apparatus 11, a sealed glove 78 extending into the chamber can be employed to manually operate the actuator. Automated actuators can also be employed—extending into the chamber or completely disposed within the chamber.

Referring again to FIG. 1, optional dribblers 80 are shown Dribblers 80 can be used for fine weight adjustments to a batch of material accumulating in receptacles 40. Each of dribblers 80 includes a cup 82, and an actuator 84 having a handle 85 that extends to the outside of chamber 20 through one of the chamber panels 28. The dribbler on the left is illustrated in a complete open configuration, whereby material is fed directly into receptacle 40 from material supply line 29. The dribbler in the middle is illustrated in a complete closed configuration, whereby material can be fed into the cup and not receptacle 40. The closed configuration can also be used when making a weight measurement to prevent additional material from accidentally being fed into receptacles 40. The dribbler on the right is shown being used to add incremental amounts of material to receptacle 40 for fine weight adjustments. Similar to the valve actuator, dribbler actuator 84 could alternatively be disposed inside of chamber 20, and be operated remotely or via a sealed glove arrangement. In preferred embodiments, dribblers 80 do not contact receptacles 40.

As noted above, in one preferred embodiment chamber 20 has a controlled environment. An inert gas (e.g., nitrogen or argon) can be pumped into chamber 20 via gas inlet 22 to Tender the chamber substantially moisture and/or oxygen free. The inert gas may be supplied either continuously or discontinuously. The inert gas exits chamber 20 through an exhaust port 24. An apparatus for regulating pressure is preferably connected to exhaust port 24 to prevent oxygen from entering the chamber via the exhaust port.

Figure 4:
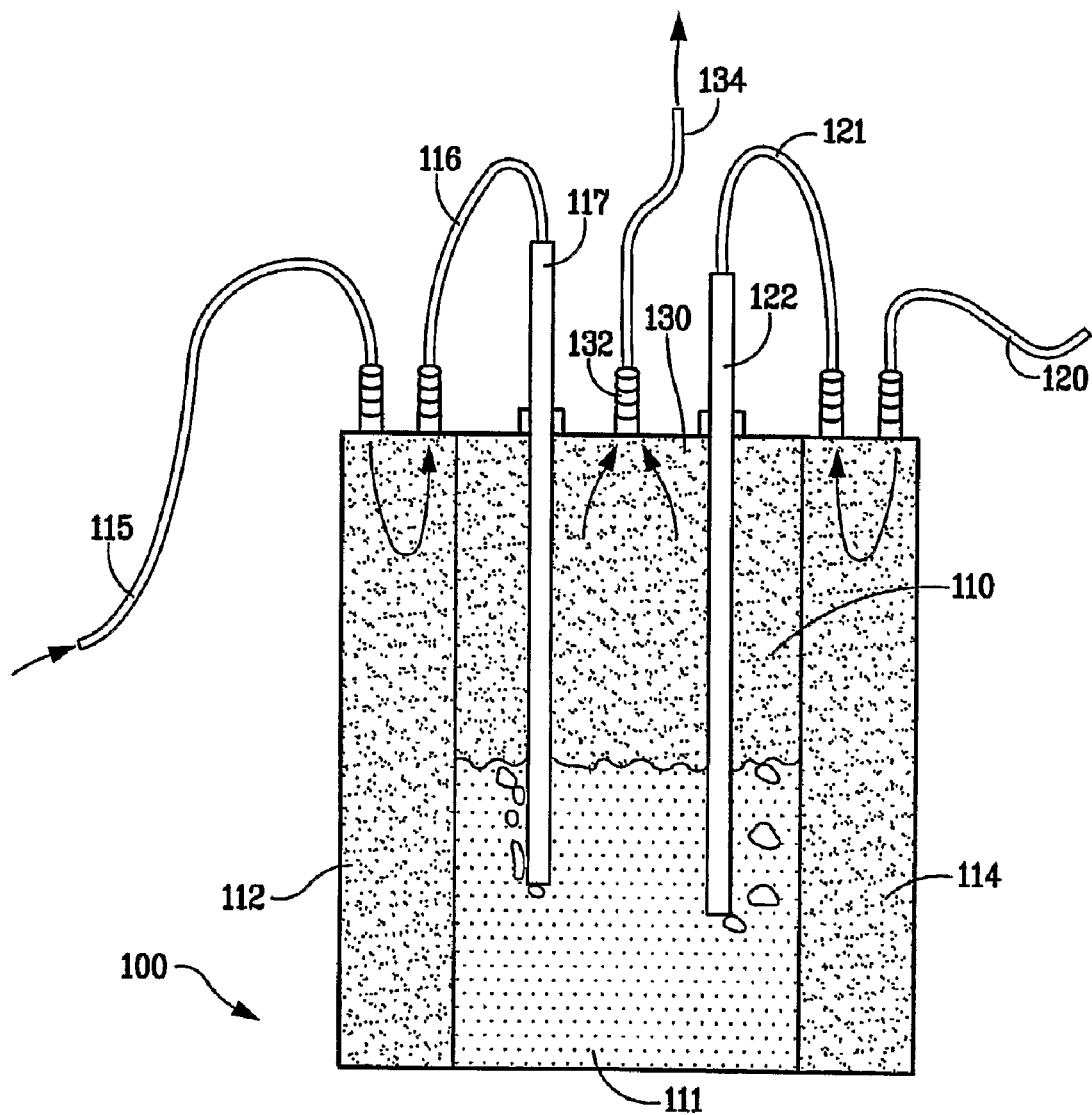
FIG. 4 is cross-sectional view of one preferred pressure regulator in accordance with the present invention.
Figure 5:
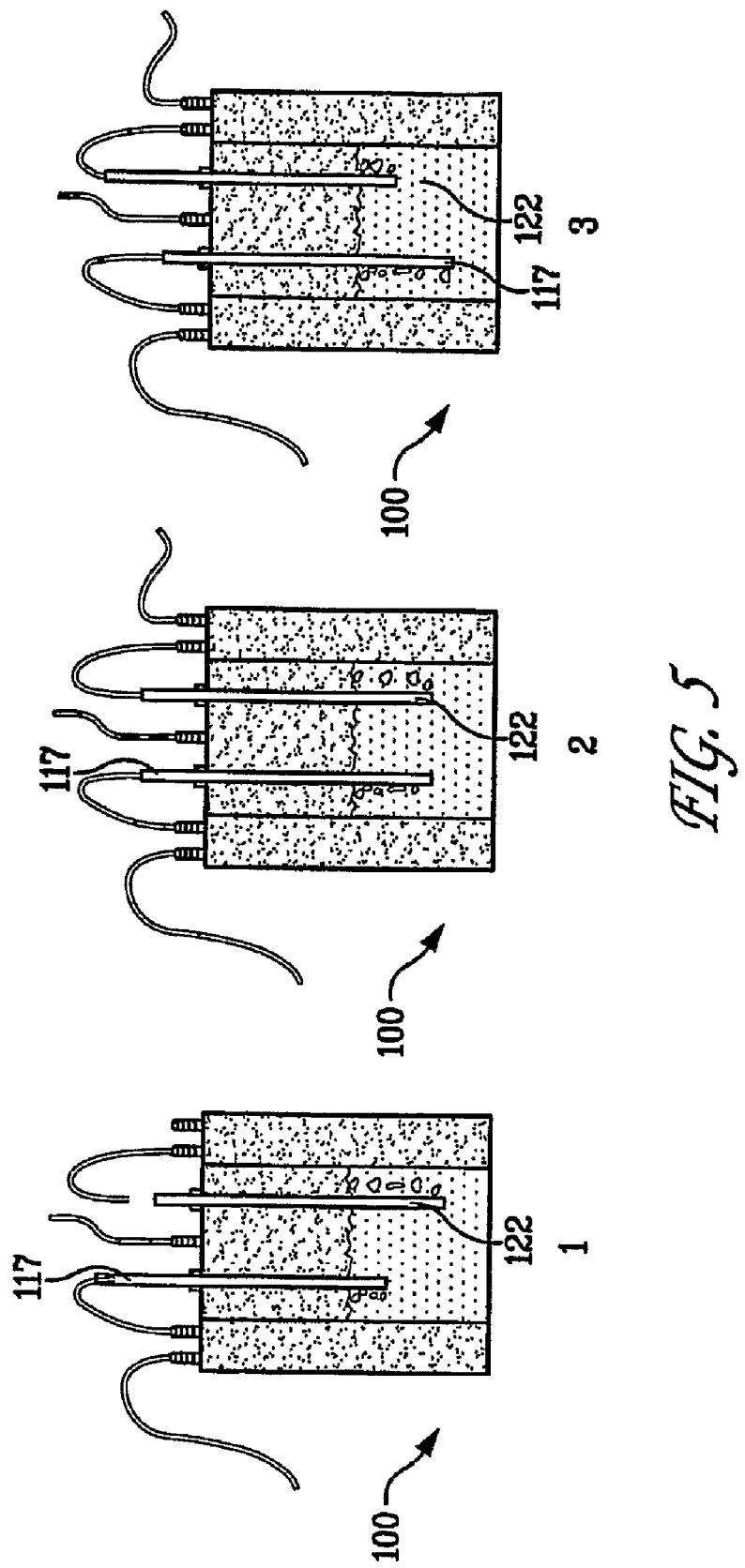
FIG. 5 is a series of three cross-sectional views of the pressure regulator shown in FIG. 4, with associated dip tubes at different positions within a partially liquid filled central compartment.

Referring now to FIGS. 4 and 5, an exemplary apparatus for regulating pressure, which can also be referred to as a bubbler, is depicted. As shown in the figures, bubbler 100 is a vacuum powered pressure regulator, that when operatively connected to a closed chamber, such as chamber 20, is capable of controlling the pressure level within a closed chamber. Bubbler 100 is essentially a container having three sealed compartments: a central compartment 110 partially filled with a liquid 111 preferably an oil), and two side compartments 112 and 114. The two side compartments are optional, and primarily serve as liquid trap zones. The bubbler is connected to a chamber via process line 115, with one end of process line 115 configured for attachment to a chamber port (e.g., exhaust port or gas outlet 24 that is shown in FIG. 1) and the opposing end configured for attachment to bubbler 100—here, attachment to a barbed nipple extending from side compartment 112. In alternative embodiments, process line 115 could be attached directly to central compartment 110.

As shown in FIGS. 4 and 5, process line 115 is fluidly connected to central compartment 110 via a flexible line 116 and a first dip tube 117 (preferably sealed with an o-ring) that is adjustably disposed in liquid 111. Bubbler 100 includes a vent line 120 that is connected to optional side compartment 114, is fluidly connected to central compartment 110 via a flexible line 121, and that terminates with a second dip tube 122 (also preferably sealed with an o-ring). Second tip tube 122 is also adjustably disposed in liquid 111. Central compartment 110 includes a head space 130 defined above liquid 111, and a vacuum port 132 in the form of a barbed nipple that is in fluid communication with head space 130. A vacuum supply line 134 is connected to vacuum port 132.

Exemplary bubbler 100 is configured to maintain a stable level of pressure within a closed chamber. Pressure fluctuations are undesirable in applications where accurate weight measurements are required since the fluctuations can affect precision of the scales. In preferred embodiments, a pressure level in a closed chamber is controlled to within about 0.5 inch of water head (0.125 kPa), preferably within about 0.25 inch of water head (0.062 kPa), and more preferably within about 0.125 inch water head (0.031 kPa).

With reference to FIGS. 1 and 4, inert gas is supplied to chamber 20 via gas inlet 22 and exhausted via gas outlet 24. Bubbler 100 is connected to gas outlet 24 by process line 115. A vacuum is applied to head space 130 at a sufficient level to cause bubbles to form at first and second dip tubes 117, 122. Pressure of the head space is controlled by adjusting the position of second dip tube 122, and pressure inside closed chamber 20 is controlled by adjusting the position of first dip tube 117. For example, and with reference to FIG. 5, configuration 1 will result in a negative pressure for process line, configuration 2 will control the process line at atmospheric pressure, and configuration 3 will all positive pressure for the inert gas sweep.

It is to be understood that the bubbler configuration shown and described above is a preferred embodiment, and that the scope of the appended claims is not limited to the same. Numerous variations to bubbler 100 are within the scope and spirit of the invention herein.

One embodiment of this invention relates to a system for accurately weighing a mass of material, comprising a closed chamber including a chamber gas inlet and a gas outlet; an inert gas supply under positive pressure connected to the gas inlet; a scale disposed in the closed chamber; and a vacuum powered pressure regulator operatively connected to the gas outlet to maintain a predetermined pressure level with the closed chamber and to substantially inhibit pressure fluctuations within the closed chamber. A system, as referred to herein, includes, in addition to the chamber the associated conduits that comprise any inlets or outlets to the chamber, plus any component connected to the chamber that is exposed to the internal environment in the chamber. In a preferred embodiment, a chamber is isolated or closed if it has one or more methods of control of the atmospheric environment in the chamber such that the chamber is maintained in a state different than ambient conditions, such as, for example, under an inert gas or a pressure higher or lower than atmospheric pressure. A chamber can also be a closed if it has one or more methods of control of a first atmospheric environment in the chamber in a state substantially different from that of a second environment in process equipment or piping in fluid or otherwise communication with that chamber. In particular, and in some preferred embodiments of this invention, the closed chamber environment is provided with an inert gas at some specified pressure. Other properties of the closed system environment can also be controlled as desired, such as moisture content or temperature. Such a closed system may have material pass through the system, with the methods of control maintaining the desired environmental conditions. In a preferred embodiment, this system is capable of measuring a 20 kg mass of material within +/−0.1 gm.

Another embodiment of this invention relates to a process for accurately weighing and dispensing a mass of material, comprising the steps of providing a closed chamber including a scale disposed therein and a receptacle operatively connected to the scale; adding a mass of material to the receptacle from a material supply line that is disposed above and physically unconnected from the receptacle; controlling pressure within the closed chamber through operation of a vacuum powered pressure regulator connected to the closed chamber; and dispensing the mass of material from the receptacle via a dispensing conduit disposed below and physically unconnected from the receptacle. In some embodiments, the process additionally comprises the step of continuously sweeping the closed chamber by introducing an inert gas under positive pressure into the closed chamber through a gas inlet; the process can further comprise exhausting the inert gas from the closed chamber through a gas outlet. In a preferred embodiment, this process is capable of measuring a 20 kg mass of material within +/−0.1 gm.

Another embodiment of this invention relates to a process for accurately weighing a mass of material, comprising the steps of providing a closed chamber including a scale disposed therein and a receptacle operatively connected to the scale; continuously sweeping the closed chamber by introducing an inert gas under positive pressure into the closed chamber through a gas inlet; continuously exhausting the inert gas from the closed chamber through a gas outlet; and controlling a pressure level within the closed chamber, when continuously exhausting the inert gas, to within about 0.5 inch water head (0.125 kPa). In some embodiments the pressure level within the closed chamber is controlled within about 0.25 inch water head (0.062 kPa), and in a preferred embodiment, the pressure level within the closed chamber is controlled within 0.125 inch water head (0.031 kPa). In a most preferred embodiment the process of this invention is capable of measuring a 20 kilogram mass of material within +/−0.1 grams.

The apparatuses, systems and processes of at least some of the preferred embodiments are particularly useful for weighing and dispensing particulate materials for making fiber polymers. An exemplary fiber polymer is a polyareneazole polymer, which is made by reacting a mix of dry ingredients with a polyphosphoric acid (PPA) solution. The dry ingredients may comprise azole-forming monomers and metal powders. Accurately weighed batches of these dry ingredients can be obtained through employment of at least some of the preferred embodiments of the present invention.

Exemplary azole-forming monomers include 2,5-dimercapto-p-phenylene diamine, terephthalic acid, bis-(4-benzoic acid), oxy-bis-(4-benzoic acid), 2,5-dihydroxyterephthalic acid, isophthalic acid, 2,5-pyridodicarboxylic acid, 2,6-napthalenedicarboxylic acid, 2,6-quinolinedicarboxylic acid, 2,6-bis(4-carboxyphenyl) pyridobisimidazole, 2,3,5,6-tetraminopyridine, 4,6-diaminoresorcinol, 2,5-diaminohydroquinone, 1,4-diamino-2,5-dithiobenzene, or any combination thereof. Preferably, the azole forming monomers include 2,3,5,6-tetraminopyridine and 2,5-dihydroxyterephthalic acid. In certain embodiments, it is preferred that that the azole-forming monomers are phosphorylated. Preferably, phosphorylated azole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The azole-forming monomers and metal powders are mixed and then the mixture is reacted with polyphosphoric acid to form a polyareneazole polymer solution. Additional polyphosphoric acid can be added to the polymer solution if desired. The polymer solution is typically extruded or spun through a die or spinneret to prepare or spin the filament.

Aspects of the present invention have been described with reference to processing particulate material associated with fiber polymers. The present invention is not limited to this application, and can be used for any number of solids and non-solids processing.

While the present invention has been described in connection with the preferred embodiments of the various figures, it is to be understood that other similar embodiments may be used or modifications and additions may be made to the described embodiment for performing the same function for the present invention without deviating therefrom. Therefore, the present invention should not be limited to any single embodiment, but rather construed in breadth and scope in accordance with the recitation of the appended claims.

What is claimed:

1. A system for accurately weighing a mass of material, comprising:
    a) a closed chamber (20) including a chamber gas inlet (22) and a gas outlet (24);
    b) an inert gas supply under positive pressure connected to the gas inlet (22);
    c) a scale (30) disposed in the closed chamber (20) ; and
    d) a vacuum powered pressure regulator (100) operatively connected to the gas outlet (24) to maintain a predetermined pressure level within the closed chamber (22) and to substantially inhibit pressure fluctuations within the closed chamber (22), wherein the vacuum powered pressure regulator (100) comprises:
        a container including a compartment (110) partially filled with a liquid (111) so as to define a head space above the liquid (111);
        a vacuum supply in fluid communication with the head space;
        a first dip tube (117) having one end extending into the liquid (111) and an opposite end operatively connected with the gas outlet (24); and
        a second dip tube (122) having one end extending into the liquid (111) and an opposite end operatively connected to a container vent.

2. The system of claim 1, wherein the container includes a liquid trap zone (112) disposed between the compartment (110) and the chamber gas outlet (24).

3. The system of claim 2, wherein the container includes a second liquid trap zone (114) disposed between the compartment (110) and the container vent.

4. The system of claim 1, wherein the system is capable of measuring a 20 kg mass of material within +/−0.1 gm.

5. The system of claim 1, further comprising a receptacle (40) connected to the scale (30).

6. The system of claim 5, further comprising a material supply line (29) disposed above and physically unconnected from the receptacle (40), and a material dispensing conduit (50) disposed below and physically unconnected from the receptacle (40).

7. A process for accurately weighing and dispensing a mass of material, comprising the steps of:
    i) providing a closed chamber (20) including a scale (30) disposed therein and a receptacle (40) operatively connected to the scale (30);
    ii) adding a mass of material to the receptacle (40) from a material supply line (29) that is disposed above and physically unconnected from the receptacle (40);
    iii) controlling pressure within the closed chamber (20) through operation of a vacuum powered pressure regulator (100) connected to the closed chamber (20); and
    iv) dispensing the mass of material from the receptacle (40) via a dispensing conduit (50) disposed below and physically unconnected from the receptacle (40);
        wherein said vacuum powered pressure regulator (100) comprises:
    a) a compartment (110) partially filled with a liquid (111) so as to define a head space above the liquid (111);
    b) a vacuum port (132) in fluid communication with the head space, so that an environmental pressure of the head space is negative;
    c) a vent line (120,121,122) for regulating pressure in the head space, the vent line (122) adjustably extending into the liquid (111);
    d) a process line (115,116,117) including a first end connected to the closed chamber (20), and an opposing second end adjustably extending into the liquid (111).

8. The process of claim 7, further comprising the step of:
continuously sweeping the closed chamber (20) by introducing an inert gas under positive pressure into the closed chamber (20) through a gas inlet (22).

9. The process of claim 8, further comprising the step of:
continuously exhausting the inert gas from the closed chamber (20) through a gas outlet (24).

10. The process of claim 7, wherein the vacuum powered pressure regulator (100) further comprises a first liquid trap zone (112) for the process line (115,116,117).

11. The process of claim 10, wherein the vacuum powered pressure regulator (100) further comprises a second liquid trap zone (114) for the vent line (120,121,122).

12. The process of claim 7, wherein the process is capable of measuring a 20 kg mass of material within +/−0.1 gm.

13. A process for accurately weighing a mass of material, comprising the steps of:

i) providing a closed chamber (20) including a scale (30) disposed therein and a receptacle (40) operatively connected to the scale (30);

ii) adding a mass of material to the receptacle (40) from a material supply line (29) that is disposed above and physically unconnected from the receptacle (40);

iii) continuously sweeping the closed chamber (20) by introducing an inert gas under positive pressure into the closed chamber (20) through a gas inlet (22);

iv) continuously exhausting the inert gas from the closed chamber (20) through a gas outlet (24); and v) controlling a pressure level within the closed chamber (20), when continuously exhausting the inert gas, to within about 0.125 kPa.

14. The process of claim 13, wherein the pressure level within the closed chamber (20) is controlled within about 0.062 kPa.

15. The process of claim 13, wherein the pressure level within the closed chamber (20) is controlled within about 0.031 kPa.

16. The process of claim 13, wherein the process is capable of measuring a 20 kg mass of material within +/−0.1 gm.

\* \* \* \* \*